BARREL CAM 63 CHART

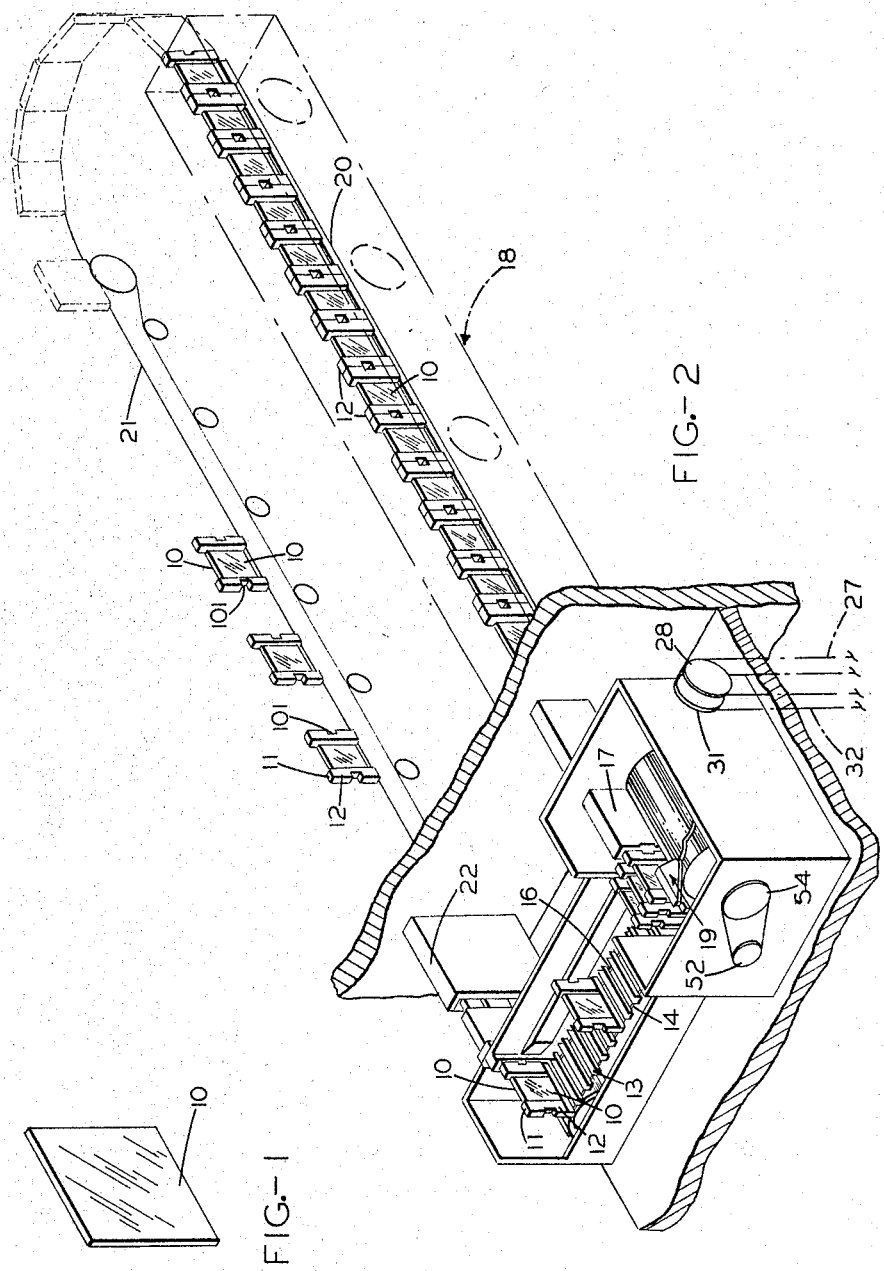

3,282,392
ARTICLE FEEDING AND TRANSFERRING APPARATUS

William H. Fowler, Danielsville, Pa., assignor to Western Electric Company Incorporated, New York, N.Y., a corporation of New York
Filed Dec. 10, 1964, Ser. No. 417,278
7 Claims. (Cl. 198—24)

This invention relates to article feeding and transferring apparatus and more particularly to an apparatus including a pair of alternately effective pushers for transferring articles from an intermittent feed device onto a trackway at a continuous rate.

In feeding articles through various treatment apparatuses such as metal sputtering chambers, metal vapor deposition furnaces, and other types of furnaces and treatment chambers, it is necessary that the articles move at a continuous rate. Problems in uniform feed rates occur where initial feed devices are of the intermittently operated type and there is a requirement to remove articles from such a conveyor and then advance the articles at a continuous uniform rate of speed. Further, articles are often transferred in one orientation and it is desired to advance the articles at a continuous rate in a second orientation.

An object of this invention is to provide a new and improved article feeding and transferring apparatus.

Another object of the invention is to provide facilities for transferring articles from an intermittent feed device onto or into a receiving device at a continuous uniform rate of speed.

A further object of the invention resides in advancing articles in a first orientation from an intermittent feed device through a treatment chamber in a second orientation and at a continuous uniform rate and then return the article to the intermittent feed device.

An additional object of the invention is the provision of a pair of pushers which are alternately operated at different rates of speed to push a succession of articles along a path at a constant rate of speed.

A still further object of the invention resides in a pair of pushers which are alternately operated to move at an initially high rate of speed to advance an article into engagement with a second article being advanced at a slower rate of speed by the other pusher.

Concomitant with the last object it is a further object of the invention to provide facilities for controlling the rates of speeds of the pushers so that the first article engages the second article with a minimum degree of impact.

With these and other objects in view, the present invention contemplates a pair of articles engaging devices which are cyclically operated to advance a succession of articles into engagement to form a train of articles which are then advanced at a constant speed.

More particularly, a succession of articles or carriers are intermittently advanced by a first conveyor into register with a trackway or receiving path leading into a treatment oven. As each article is positioned, one of the pushers engages and transfers the article onto the receiving trackway where the article engages a previously advanced article with a minimum degree of impact. Both pushers operate through identical cycles wherein a first pusher will engage an article and rapidly move it toward the trackway and into engagement with an article that is already positioned on the trackway and in the process of being advanced by the other pusher. The first pusher will advance the engaged article and all other articles positioned on the trackway. Following engagement of an advancing article with the trailing article of the train of articles, the other pusher will be disengaged from the trailing article and be returned to an initial position in anticipation of another cycle of operation.

Other objects and advantages of the present invention will be apparent upon consideration of the following detailed description when considered in conjunction with the accompanying drawing, wherein:

FIG. 1 is a perspective view of a ceramic substrate that is to be conveyed by the apparatus shown in the other figures through a metal sputtering or vapor deposition chamber;

FIG. 2 is a perspective view of an apparatus for advancing articles from an intermittent conveyor at a continuous rate through a metal sputtering chamber, embodying the principles of the present invention;

Figure 3:
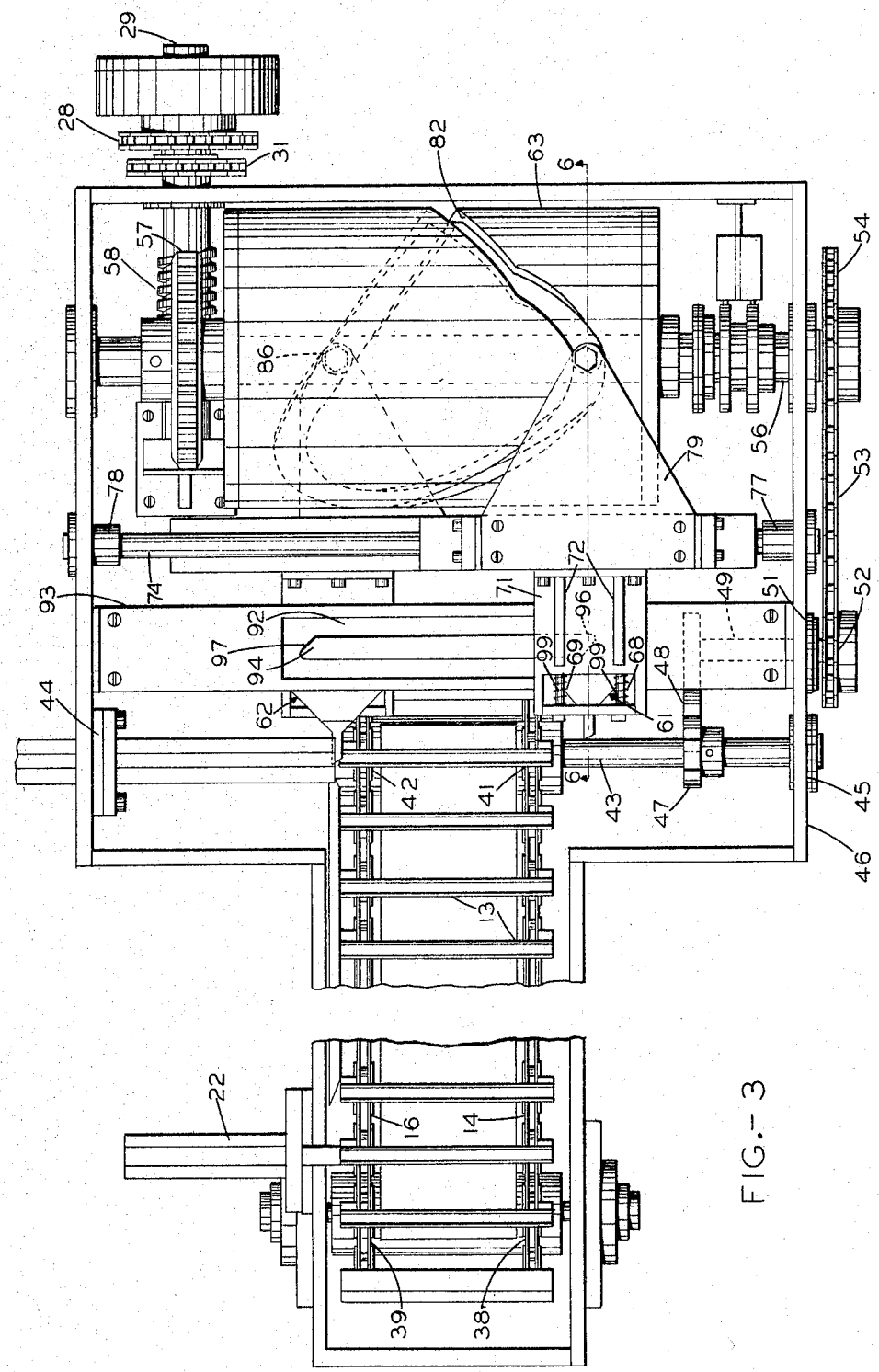
FIG. 3 is a top plan view of the conveyors and feeding mechanisms embodied in the apparatus shown in FIG. 2.

Referring first to FIG. 1, there is shown a substrate of ceramic material or other material 10 onto which is to be sputtered a thin layer or film of metal by the apparatus shown in the other views. A pair of substrates 10 are loaded in recesses 11 (see FIG. 2) formed in a carrier 12. A plurality of carriers 12 is provided and each is mounted within the open end of a U-shaped channel member 13 attached to a pair of endless chains 14 and 16. The chains 14 and 16 are intermittently operated to advance each succeeding carrier 12 into register with a trackway 17 leading into a metal sputtering chamber generally designated by the reference numeral 18.

As each carrier 12 approaches the trackway 17, it is engaged by a feed device generally designated by the reference numeral 19, and advanced in such a manner that it moves into the trackway at a constant rate of speed. Each succeeding carrier 12 engages the preceding carrier so that carriers 12 advancing through the chamber 18 moves at a constant rate of speed. In the chamber 18 the carriers move along guideways 20 and then onto a constantly rotating endless cog chain conveyor 21. Each carrier 12 is advanced through an exit trackway 22 where an empty channel member 13 is positioned to receive the carrier.

Figure 4:
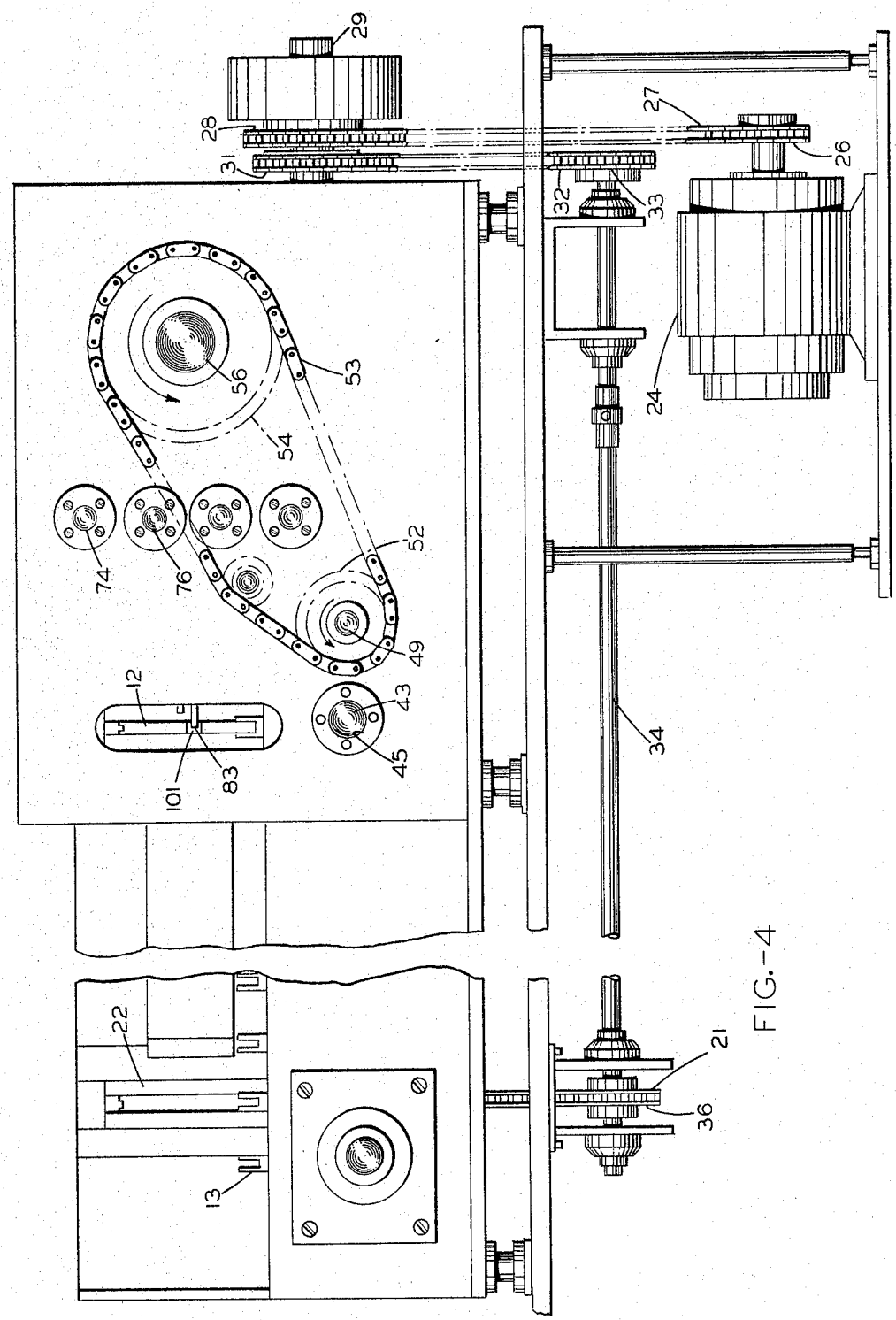
FIG. 4 is a front elevational view of FIG. 3 showing the drive mechanisms for the conveyors and feed devices.
Figure 5:
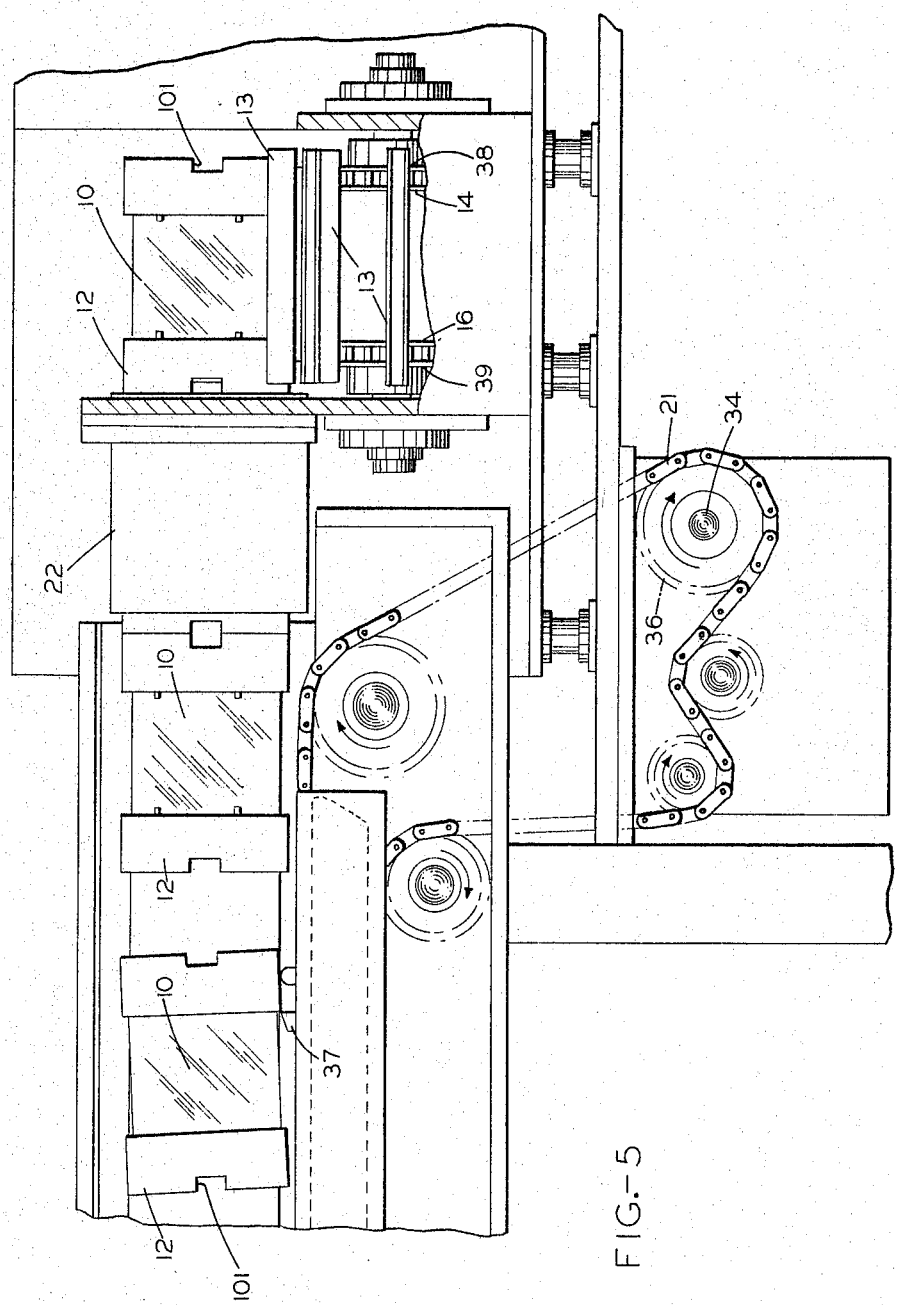
FIG. 5 is a side elevational view of the left hand portion of the apparatus shown in FIG. 3.

Referring now to FIGS. 3, 4, and 5, for a consideration of the drive mechanism for the chain conveyor 21 as well as the chains 14 and 16, there is shown a motor 24 (see FIG. 4) which rotates a sprocket 26 to drive a chain 27 and a sprocket 28. Sprocket 28 is keyed to a shaft 29 having a sprocket 31 thereon to drive a chain 32 and a sprocket 33. This sprocket 33 is keyed to a shaft 34 to rotate a sprocket 36. The sprocket 36 (see FIG. 5) drives a chain 21 which has spaced cogs 37 attached thereto. As shown in FIG. 5, the carriers 12 move through the exit trackway 22 onto a U-shaped channel 13 which is attached to chains 14 and 16.

Considering now the drive for the chains 14 and 16 (see FIG. 3) which are mounted on a pair of idler sprockets 38 and 39, respectively. These chains also ride over a pair of drive sprockets 41 and 42 connected to a shaft 43 mounted within suitable bearings 44 and 45 mounted in frame 46. Mounted on the shaft 43 is a Geneva wheel 47 actuated by a cam driver 48 secured to a shaft 49. The shaft 49 extends through a bearing 51 to receive a sprocket 52 driven by chain 53. Chain 53 is driven by a sprocket 54 mounted on a shaft 56 which also has mounted thereon a worm wheel 57 rotated by a worm 58 secured to the shaft 29 which, in turn, is driven by the motor 24 through the sprocket 26, chain 27, and sprocket 28. This particular drive mechanism imparts through the Geneva wheel mechanism an intermittent motion to the chains 14 and 16 to sequentially advance each succeeding carrier 12 into register with the entrance trackway 17.

Figure 6:
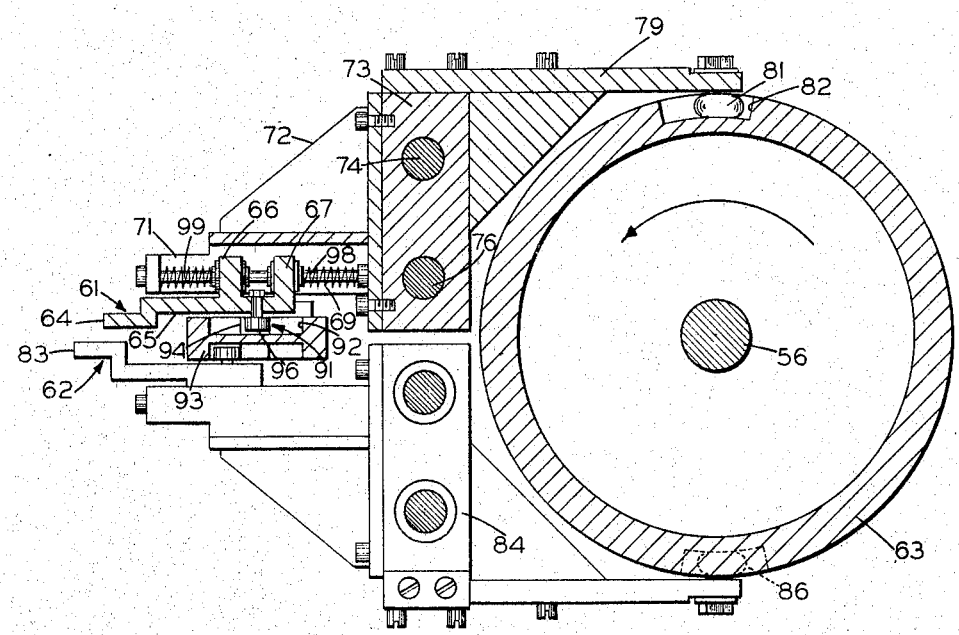
FIG. 6 is a cross sectional view taken along lines 6—6 of FIG. 3 particularly illustrating the apparatus for feeding articles at a constant rate through the metal sputtering chamber.

Referring now to FIGS. 3 and 6 for an explanation of the mechanism for advancing the intermittently positioned carriers 12 into the trackway at a constant rate of speed. As each carrier is positioned in register with the trackway 17, one of a pair of pusher devices, generally designated by the reference numerals 61 and 62, are rendered effective to engage and move the registered carrier 12. The pusher devices 61 and 62 are successively rendered effective under the control of a barrel cam 63 secured to the shaft 56 which is continuously rotated by the drive mechanism operated by the motor 24.

Considering the upper pusher device 61, it comprises a pusher finger 64 projecting from a frame plate 65 having a pair of boss bars 66 and 67 that are slidably mounted on a pair of guide rods 68 and 69. These rods 68 and 69 are fixed within a frame unit 71 attached by a pair of brackets 72 to a slide block 73 slidably supported on a pair of guide rods 74 and 76 fixed in pairs of end bushings 77 and 78 mounted in the sides of the frame 46. Extending from the upper portion of the slide block 73 is a lateral arm 79 having a depending cam follower 81 riding in a cam track 82 formed in the barrel cam 63.

The pusher device 62 is an inverted version of the pusher device 61 and includes a pusher finger 83 actuated by a slide block 84 identical to slide block 73 and a cam follower 86 riding in the cam slot 82. Returning now to a consideration of pusher device 61, the cam slot 82 is effective to reciprocate this pusher device to move forward and advance the carriers 12 into the trackway 17. The pusher finger 64 is moved into and out of engagement with the carrier 12 by a depending cam 91 riding in a cam slot 92 formed in the top surface of a crossbar 93 secured at ends to the opposite sides of the frame 46. A central cam land 94 is formed in the cam slot 93 and has oppositely bevelled extremities 96 and 97.

In operation of the pusher device 61, assume that it is in an initial position as shown in FIG. 3, in which case, a first pair of springs 98 (only one shown in FIG. 6) mounted about rods 68 and 69 position the cam follower 91 in register with the bevelled end 96 of the cam land 94. Rotation of the barrel cam 63 causes the cam follower 81 to move the pusher device 61 toward the entrance trackway 17 whereupon the bevelled surface 96 is effective to react on the cam follower 91 to thrust the finger toward the left as viewed in FIGS. 3 and 6. Movement of the cam follower 91 moves the finger 61 within a notch 101 (see FIG. 2) formed in the carrier 12 and then engages the finger with the carrier to advance the carrier toward the entrance trackway 17.

Figure 7:
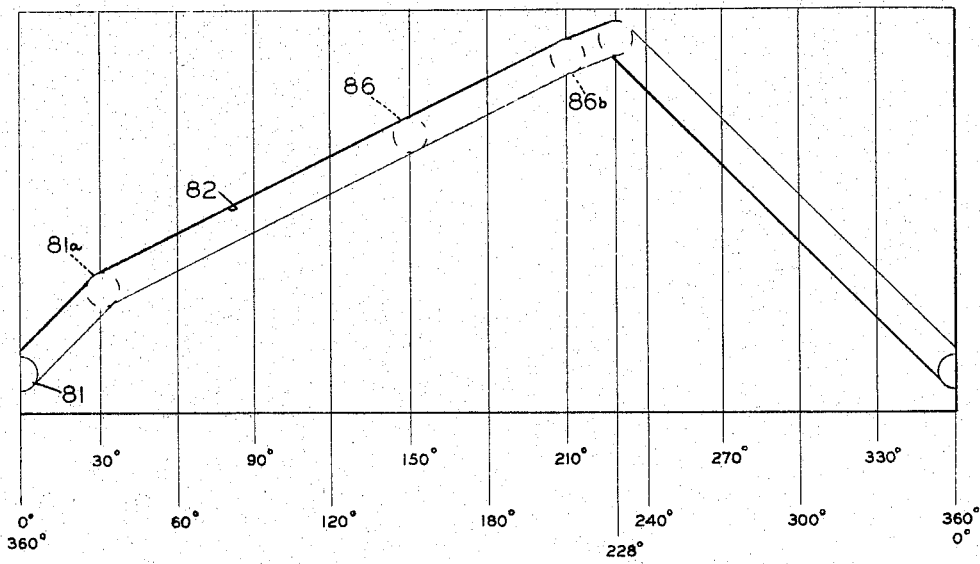
FIG. 7 is a developed view of a cam for controlling the feed apparatus.

A developed plan of the cam track 82 is shown in FIG. 7 and it will be noted that there is an initial steep rise (from 0° to 30°) so that the initial movement of the carrier 12 is at a rapid rate. This rate of movement decreases as the forward end of the carrier 12 moves into engagement with a carrier 12 that has been previously positioned within the entrance trackway 17 by the pusher device 62 thereby avoiding any detrimental impact between the engaged carriers. As the pusher device 61 completes its forward feed movement, the cam follower 91 moves beyond the bevelled end 97 of the cam land 94 whereupon a pair of springs 99, mounted about the foreward sections of the rods 68 and 69, is rendered effective to thrust the cam finger 64 toward the right and from engagement with the carrier as viewed in FIGS. 3 and 6. The barrel cam 63 is now rendered effective to reverse the movement of the pusher device 61 whereupon the bevelled end 97 engages the cam follower 91 to further withdraw the finger 64 against the action of the springs 98. The pusher device 61 is thus returned to the initial position whereupon the compressed springs 98 again move the cam follower into alignment with the bevelled end 96 of the cam land 94 in anticipation of another cycle of operation.

The other pusher device 62 operates in exactly the same manner, but out of phase, that is, while the pusher device 61 is advancing a carrier 12 into the entrance trackway 17, the pusher device 62 is being withdrawn from the engaged carrier and then returned into a position to engage the next succeeding carrier 12 advanced by the chains 14 and 16.

A further understanding of the operation of the pusher devices 61 and 62 may be had by referring to FIG. 7 showing the developed cam slot 82. As shown, the cam follower 81 is positioned to initiate a forward feed of the pusher device 61. At this time, the cam follower 86 is in the process of advancing the pusher 62 in a forward direction to move a carrier 12 into the entrance trackway 17. The cam follower 81 will initially move at a very rapid rate so that the associated pusher 61 advances a carrier 12 to overtake the carrier being advanced by the pusher device 62. At the point that the one carrier overtakes the other, the respective followers 81 and 86 move to the positions marked 81a (30°) and 86b (210°) on the cam chart shown in FIG. 7. It will be noted that the cam slot 82 has a slight horizontal section just beyond the 210° mark. This is at the point of engagement and results in the disengagement of the pusher device 62 from the carrier 12. The leading carrier 12 will not stop because at this time, the succeeding carrier which is still being moved by the pusher device 61 engages the leading carrier. The engagement and transfer of drive from the pusher device 62 to the pusher device 61, occurs with a minimum degree of shock. The pusher device 62 continues to advance with the two carriers 12 now being advanced by the pusher device 61 through the entrance trackway 17 until the cam 86 moves into that portion of the cam slot 82 designated 228°. At this point, the cam follower 86 moves along the falling section of the cam slot 82 to withdraw and restore the pusher device 62 to the initial position in anticipation of another cycle of operation.

It is to be understood that the above described arrangements of apparatus and construction of elemental parts are simply illustrative of an application of the principles of the invention and many other modifications may be made without departing from the invention.

What is claimed is:

1. In an apparatus for advancing articles from an intermittently driven conveyor onto a receiving trackway,
  a pair of pushers moveably mounted for engaging and transferring articles from said conveyor onto said trackway,
  means for alternately advancing said pushers at a rapid speed and then a slow speed to engage and transfer each succeeding article advanced by said intermittently driven conveyor, whereupon each succeeding article is advanced to overtake and engage each preceding article, and
  means for alternately withdrawing said pushers from said articles following engagement of each succeeding article with each preceding article.

2. In an apparatus for advancing a pair of articles along a trackway,
  first means for engaging and advancing a first article along said trackway at a first rate of speed,
  a separate second means for engaging and advancing a second article along said trackway at a second rate of speed which is greater than said first rate to advance said second article into engagement with said first article, and means rendered effective following engagement of said second article with said first article for disengaging said first means from said first article.

3. In an apparatus for feeding and transferring article carriers,
    means for intermittently advancing a succession of article carriers in a first direction,
    a first means for transferring said article carriers in a direction transverse to said first direction,
    a second means for transferring article carriers in a direction transverse to said first direction,
    means for alternately moving said first and second transferring means into position to engage suceeding article carriers, and
    means for alternately driving said first and second transferring means at a fast rate and then at a slow rate while both said first and second transferring means are engaging article carriers.

4. In an apparatus for transferring articles from a conveyor onto a trackway,
    a first pusher moveably mounted for engaging and transferring a first article from said conveyor onto said trackway,
    first means for moving said first pusher at a rapid rate and then at a slow rate to transfer said first article,
    a second pusher moveably mounted for engaging and transferring a second article advanced by said conveyor into the plate vacated by said first article,
    second means for moving said second pusher at a rapid rate to advance said second article into engagement with said first article during the period that said first means moves said pusher at said slow rate, and
    means rendered effective following said engagement of said second and first articles for withdrawing said first pusher from engagement with said first article and moving said first pusher into position to transfer the next succeeding article.

5. In an apparatus for conveying articles,
    a first carriage mounted for rectilinear coordinate motion,
    a second carriage mounted beneath said first carriage for rectilinear coordinate motion,
    means for intermittently advancing a succession of articles toward said carriages,
    means for imparting rectilinear coordinate movement to said first carriage wherein the forward motion along a path nearest the advancing articles is at a rapid rate and then a slow rate,
    means for imparting rectilinear coordinate movement to said second carriage wherein the forward motion along a path nearest the advancing articles is at a rapid rate and then a slow rate,
    said means for imparting said rectilinear coordinate motion including mounting facilities for advancing said carriages a spaced distance from each other,
    a first pusher mounted on said first carriage for engaging a lateral edge of a leading advanced article and transversely shifting said article at a rapid rate and then a slow rate.
    a second pusher mounted on said second carriage for engaging a lateral edge of a succeeding advanced article and transversely moving said article at a rapid rate into engagement with the lateral edge of the previously shifted article.

6. An apparatus for conveying articles,
    a first carriage mounted for rectilinear coordinate movement,
    a second carriage mounted for rectilinear coordinate in a plane beneath said first carriage,
    a first barrel cam having a cam track,
    a first follower projecting from said first carriage into said cam track,
    a second follower projecting from said second carriage into said cam track at a distance 180° from said first follower,
    said cam track having a configuration for imparting reciprocating movement to both of said carriages, and having a flat section and a steep rise section, said step rise section terminating 180° away from said flat section, and
    means to rotate said cam to move said carriages to simultaneously engage and advance articles whereupon the article engaged by the carriage during advance by said steep rise section overtakes the article engaged by the other carriage during the time the follower moves into said flat section.

7. In an apparatus for moving a pair of articles,
    a first carriage mounted for rectilinear coordinate movement in a first plane,
    a second carriage mounted for rectilinear coordinate movement in a second plane spaced from said first plane,
    means for simultaneously imparting out of phase reciprocating movements to said first and second carriage,
    a first slide mounted in said first carriage,
    a first cam track mounted on said first carriage having a rhomboidal shape,
    a second carriage having a rhomboidal shape,
    a first cam follower extending from said first slide,
    a second cam follower extending from said second slide,
    first resilient means urging said first slide to move said first cam follower into engagement with said first cam track whereupon said first slide moves transverse of said reciprocating movements at the extremities of said reciprocating movements,
    second resilient means urging said second slide to move said second cam follower into engagement with said second cam track whereupon said slide moves transverse of said reciprocating movements at the extremities of said reciprocating movement,
    feed fingers mounted said slides for alternately engaging and feeding articles,
    means for advancing a succession of articles into position to be engaged by said feed fingers, and
    a cam track included in said reciprocating means for alternately driving a first carriage a slow rate and the other carriage at a fast rate to move such succeeding article into engagement with the proceeding article.

References Cited by the Examiner
UNITED STATES PATENTS 1,892,627  12/1932  Pearson _____ 198—22 X
1,924,146  8/1933  Almgren _____ 198—22 X

FOREIGN PATENTS 879,437  11/1942  France.

MARVIN A. CHAMPION, *Primary Examiner.*

UNITED STATES PATENT OFFICE
CERTIFICATE OF CORRECTION

Patent No. 3,282,392                             November 1, 1966

William H. Fowler

It is hereby certified that error appears in the above numbered patent requiring correction and that the said Letters Patent should read as corrected below.

Column 1, line 55, after "constant" insert -- rate of --; column 5, line 29, for "plate" read -- place --.

Signed and sealed this 5th day of September 1967.

(SEAL)
Attest:

ERNEST W. SWIDER
Attesting Officer

EDWARD J. BRENNER
Commissioner of Patents